United States Patent
Porter

(10) Patent No.: US 6,481,172 B1
(45) Date of Patent: *Nov. 19, 2002

(54) STRUCTURAL WALL PANELS

(76) Inventor: William H. Porter, P.O. Box 249, Saugatuck, MI (US) 49453

(*) Notice: Subject to any disclaimer, the term of this patent is extended or adjusted under 35 U.S.C. 154(b) by 0 days.

This patent is subject to a terminal disclaimer.

(21) Appl. No.: 09/481,893

(22) Filed: Jan. 12, 2000

(51) Int. Cl.[7] .................................................. E04B 2/00
(52) U.S. Cl. ................. 52/506.01; 52/794.1; 52/309.9; 52/309.7; 428/317.7
(58) Field of Search ........................ 52/309.9, 309.11, 52/273, 293.3

(56) References Cited

U.S. PATENT DOCUMENTS

| | | | |
|---|---|---|---|
| 4,443,988 A | * 4/1984 | Coutu, Sr. | 52/309.9 |
| 5,953,883 A | * 9/1999 | Ojala | 52/794.1 |
| 6,096,416 A | * 8/2000 | Attenberg | 428/317.7 |
| 6,205,729 B1 | * 3/2001 | Porter | 52/309.7 |

* cited by examiner

Primary Examiner—Carl D. Friedman
Assistant Examiner—Steve Varner
(74) Attorney, Agent, or Firm—Emrich & Dithmar

(57) ABSTRACT

A generally planar structural insulated panel for use in the wall of a building structure includes an inner core of insulating material such as plastic foam. Disposed on and attached to opposed surfaces of the insulating core are outer facings in the form of thick sheets of paper impregnated with plastic such as urethane, polystyrene or polyisocyanurate. The plastic impregnated paper (PIP) sheets are 0.14" to 0.70" thick and extend several inches beyond the edges of the panel's insulating core. The PIP sheets provide the panel with high tensile strength and the peripheral edges of the PIP sheets are adapted to receive coupling pins such as nails, screws or staples for mounting the panel to 2× dimensional lumber members in the building structure. The high tensile strength of the PIP sheets also provides secure mounting of the panel to the adjacent structural members. Compression struts are provided within the panel's insulating foam core and inside the panel's outer PIP facings to accommodate large axial loading on the panel. The inner PIP sheet may have attached thereto a gypsum or cementous composite sheet to provide a finished panel when installed in a building structure. Adjacent PIP facings of a pair of structural panels may be arranged in an overlapping manner and connected to a structural member such as a spline or stud to provide a high strength, sealed connection between the panels.

29 Claims, 4 Drawing Sheets

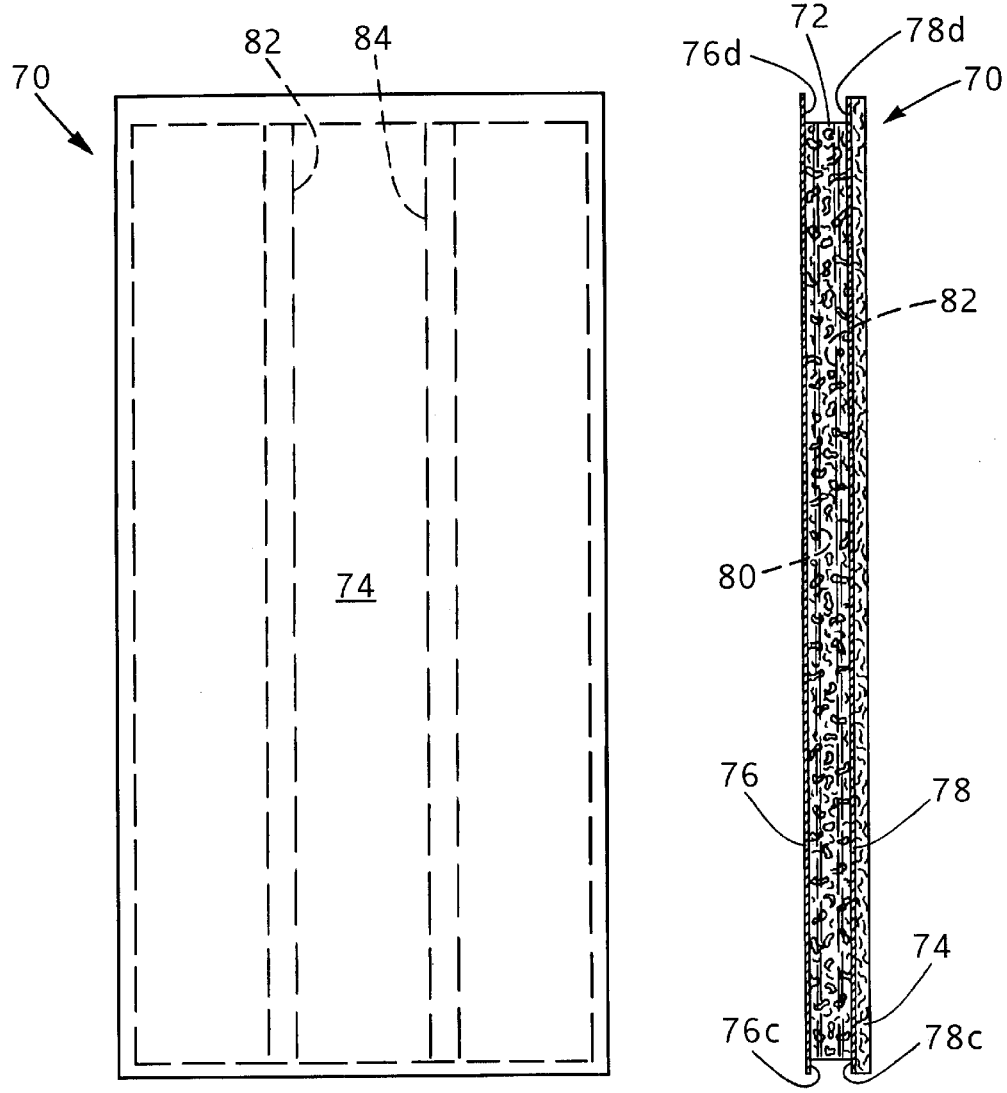
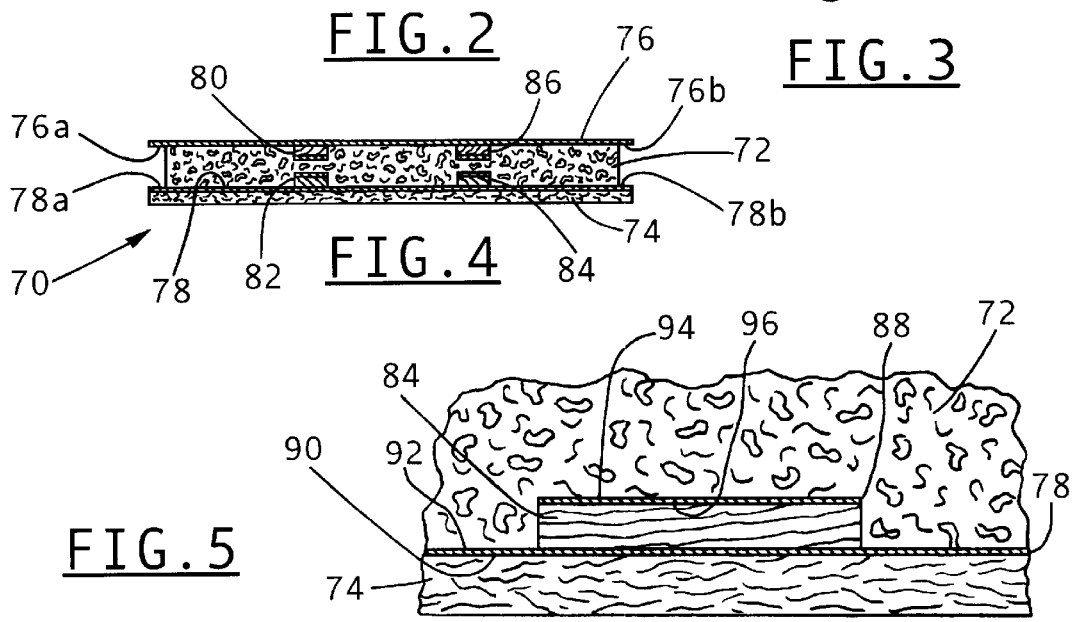

STRUCTURAL WALL PANELS

FIELD OF THE INVENTION

This invention relates generally to structural panels for use in building construction and is particularly directed to an insulated structural panel of high compression and tensile strength for use in a wall of a building structure.

BACKGROUND OF THE INVENTION

Structural insulated panels are gaining increasing acceptance in building construction in replacing the conventional combination of drywall sheets and rolls of fiberglass insulation. The typical structural insulated panel includes an inner insulating core such as of plastic foam and at least one outer facing comprised of a rigid material such as gypsum or cementous composite, oriented strand board (OSB), or an agricultural board product such as strawboard. The structural insulated panel is maintained in position in the building structure by means of its outer facings which are secured to adjacent structural members by various means. For example, wood or metal splines may be attached to the panel's outer facing, or facings, and also secured to an adjacent structural member such as a 2x dimensional lumber member. In some cases, the spline is inserted between the panel's insulating foam core and one of its outer facings. Attachment of the spline to the panel as well as to an adjacent structural member may be by conventional means such as nails, screws or a high strength adhesive. In some cases, the peripheral edges of the panel's outer facing, or facings, are attached to adjacent structural members by nails or screws. The nails or screws may also be inserted through the entire panel including its outer facings and inner insulating core in attaching the panel to adjacent structural members. These structural insulated panel installation arrangements frequently require modification of the panel before it can be installed in a particular wall space. The modification of the panel as well as its installation may also require additional installation components or special installation design considerations. These additional installation components may not be readily available to the typical "amateur" carpenter and the design considerations in this type of installation may also be beyond his or her capabilities.

The present invention addresses the aforementioned limitations of the prior art by providing a structural insulated panel which is easily and economically mass produced and is easily installed in a building structure using techniques and hardware similar to those used in the installation of conventional gypsum drywall sheets. The inventive structural insulated panels, thus, could be made available on a mass-produced basis such as in lumber yards for use on a do-it-yourself basis by the typical amateur carpenter.

OBJECTS AND SUMMARY OF THE INVENTION

Accordingly, it is an object of the present invention to provide an improved structural insulated wall or roof panel and installation arrangement for the panel with 2x dimensional lumber members in a building structure.

It is another object of the present invention to provide a structural insulated panel which can be easily and securely attached to conventional 2x dimensional lumber members using connectors such as nails, screws, or staples in a building structure.

Yet another object of the present invention is to provide an insulated wall or roof panel for building construction which is lightweight, easily installed in and attached to conventional framing members, and has high tensile strength and axial loading capacity.

A further object of the present invention is to provide a unitary structural insulated panel for use in a building wall having sufficient axial loading capacity to span extended distances and eliminate the need for spaced vertical studs in a building structure.

This invention contemplates a structural panel for use with 2x stick structural members in a building structure, the structural panel comprising a generally planar insulating core having plural peripheral edges and first and second opposed sides; first and second high tensile strength plastic impregnated paper sheets respectively attached to the first and second sides of the insulating core, each of the plastic impregnated paper sheets having plural edge portions each extending outwardly beyond an adjacent edge of the insulating core; and connecting pins inserted through edge portions of at least one of the plastic impregnated paper sheets and into an adjacent 2x stick structural member for mounting the structural panel in the building structure. This invention further contemplates the use of a stud or a spline, which may be insulated, for connecting a pair of structural panels, where the plastic impregnated paper sheet facings of the panels are connected to the stud or spline by nails, screws, or staples. The facings of adjacent panels attached to a common stud or spline may be arranged in an overlapping manner for increased strength and a better moisture seal between the panels.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIGS. 2 and 3 are front elevation and side elevation views, respectively, shown partially in phantom of a structural wall panel in accordance with the present invention;

FIG. 4 is a top plan view of the structural wall panel shown in FIGS. 2 and 3;

FIG. 5 is an enlarged view of a portion of the top plan view of FIG. 4 showing details of the manner in which a compression strut is incorporated in a structural wall panel in accordance with one aspect of the present invention;

DETAILED DESCRIPTION OF PREFERRED EMBODIMENTS

Figure 1:
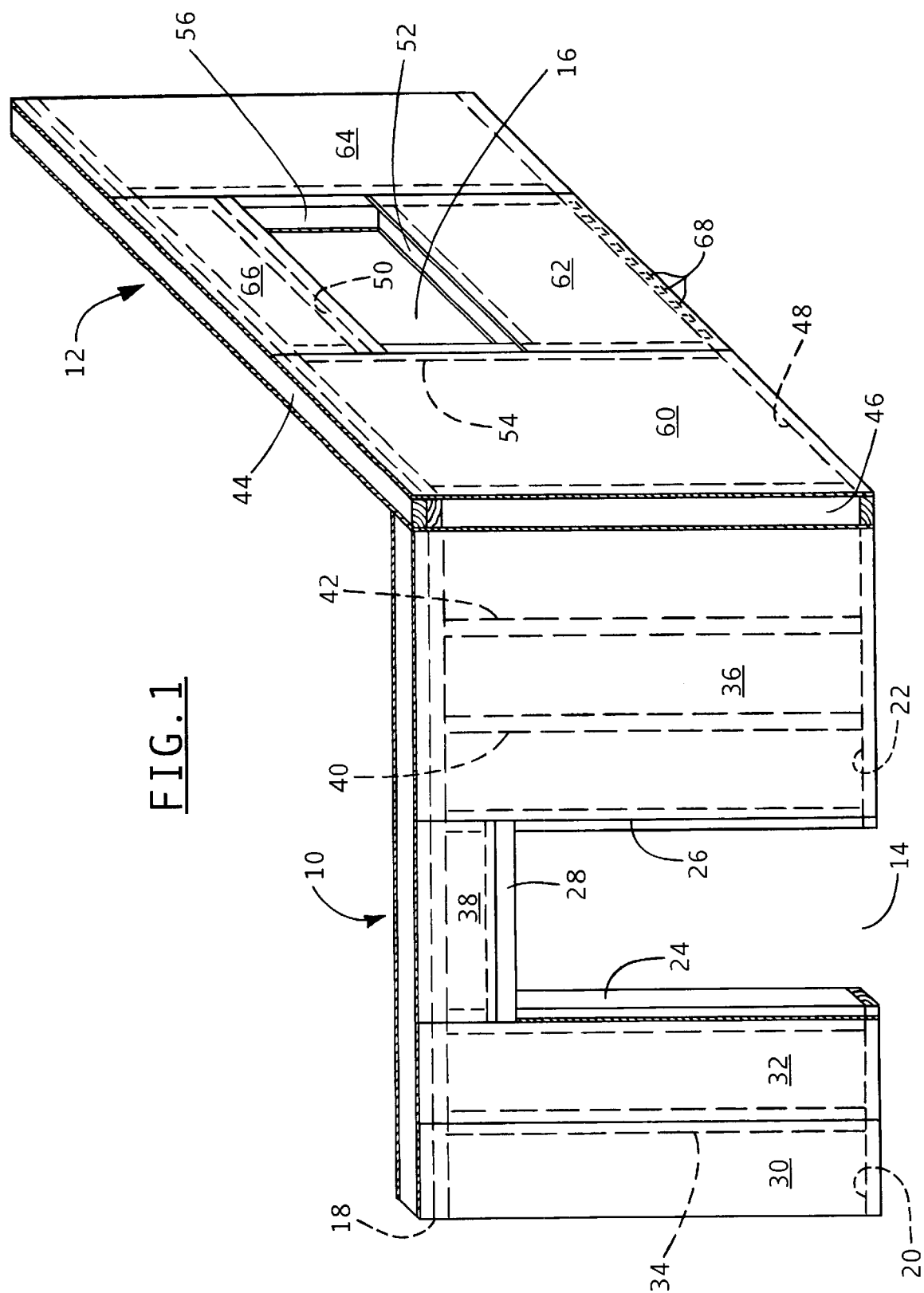
FIG. 1 is a perspective view shown partially in phantom of two connected wall sections incorporating structural wall panels in accordance with the present invention.

Referring to FIG. 1, there is shown a perspective view partially in phantom of first and second wall sections 10 and 12 in accordance with the present invention joined together in an end-to-end manner to form a corner. Each of the first and second wall sections 10,12 has generally the same construction, except that the first wall section incorporates a door opening 14, while the second wall section 12 incorporates a window opening 16.

The first wall section 10 is formed from first, second, third and fourth structural wall panels 30, 32, 36 and 38 in accordance with the present invention. Disposed at the bottom and connected to lower edge portions of the first and second structural wall panels 30, 32 is a first base plate 20 shown partially in dotted line form. First base plate 20, as in the case of the other base plates described below, rests upon and is attached to a support base such as a floor or foundation which is not shown in the figure for simplicity. The first and second structural wall panels 30,32 are connected together in an edge-abutting manner by means of an insulated spline 34 shown in the figure in dotted line form. Engaging and attached to a lower edge of the third structural wall panel 36 is a second base plate 22. The first and second base plates 20,22, as in the case of the other structural members supporting the various wall panels, is preferably in the form of a 2× structural member comprised of either wood, wood composite or metal.

Engaging and attached to respective upper edge portions of the first, second, third and fourth structural wall panels 30,32,36 and 38 is a double top plate 18 comprised of two connected 2× structural members. Double top plate 18 would typically be connected to a roof or a ceiling which is not shown in the figure for simplicity. Doorway 14 within the first wall section 10 is defined by first and second door frame members 24 and 26 and a door header 28. A lateral edge of the second structural wall panel 32 is connected to the first door frame member 24, while a lateral edge of the third structural wall panel 36 is connected to the second door frame member 26. A second, opposed lateral edge of the third structural wall panel 36 is connected to a corner stud 46. Disposed in a spaced manner within the third structural wall panel 36 are first and second vertical compression struts 40 and 42 shown in the figure in dotted line form. First and second compression struts 40,42 provide the third structural wall panel 36 with high compressive strength for supporting heavy loads such of a ceiling or a roof.

Disposed above and attached along a lower edge thereof to the door header 28 is the fourth structural wall panel 38. An upper edge of the fourth structural wall panel 38 is attached to the double top plate 18 as previously described. Opposed lateral edges of the fourth structural wall panel 38 are connected to respective edges of the second and third structural wall panels 32 and 36.

The second wall section 12 similarly includes fifth, sixth, seventh and eighth structural wall panels 60,62,64 and 66 in accordance with the present invention. Lower edges of each of the fifth, sixth and seventh structural wall panels 60,62 and 64 are disposed on and attached to a base plate 48 shown in dotted line form. Respective upper edges of the fifth, seventh and eighth structural wall panels 60,64 and 66 engage and are attached to a double top plate 44. A lateral edge of the fifth structural wall panel 60 is connected to corner stud 46. Disposed within the second wall section 12 is the aforementioned window opening 16 defined by a header 50, a sill 52, and first and second frame members 54 and 56. It is the composition and configuration of each of the structural wall panels and the manner in which these wall panels are connected to the various structural members shown in the figure, such as the base plates, headers and vertical frame members, or studs, which form the basis of the present invention. For example, in FIG. 1 the lower edge of the sixth structural wall panel 62 is shown attached to base plate 48 by means of spaced staples 68. Additional connecting pins such as nails, screws or staples could be shown attaching the remaining structural wall panels to associated structural members, however, these additional connectors are omitted from FIG. 1 for simplicity. The following paragraphs describe the composition and configuration of the inventive structural wall panels and the manner in which they are securely attached to adjacent structural support members in accordance with the present invention.

Referring to FIGS. 2 and 3, there are respectively shown partially in phantom front and side elevation views of a structural wall panel 70 in accordance with the principles of the present invention. FIG. 4 is a top plan view of the structural wall panel 70 shown in FIGS. 2 and 3. Structural wall panel 70 is generally planar and includes an inner insulating core 72. The panel's insulating core 72 may be comprised of a plastic foam such as of expanded polystyrene or urethane, or may be comprised of an agricultural product such as strawboard or wheatboard. The panel's insulating core 72 is provided with a pair of opposed outer facings to which are respectively attached first and second plastic impregnated paper (PIP) sheets 76 and 78. PIP facings 76,78 are preferably comprised of paper or box board impregnated with a plastic such as urethane, polystyrene or polyisocyanurate. The plastic impregnated paper is commercially available from Weyerhaeuser and is sold under the trade name P-CELL. The first and second PIP sheets 76,78 are attached to the respective opposed facings of the panel's insulating core 72 by any of the more conventional adhesive materials such as urethane or epoxy cement, glue or a mastic coating for bonding the PIP sheets to the insulating core. Attached to the second PIP sheet 78 is an inner panel facing 74. The panel's inner facing 74 is in the form of a thin sheet and may be comprised of a conventional building material such as gypsum or cementous composite or oriented strand board (OSB).

The first and second PIP sheets 76 and 78 attached to opposed surfaces of the panel's insulating core 72 substantially increase the racking (bending) strength as well as the tensile strength of the panel and also serve as a vapor barrier near the outer and inner surfaces of an exterior wall or roof deck to prevent moisture from entering the panel's insulating core from either the outside environment or from an inside room of a building structure. The PIP layers provide much improved weather resistance over that afforded by other conventional panel layer compositions such as oriented strand board (OSB) and gypsum or cementous composite. As shown in the figures and in accordance with the present invention, each of the first and second PIP sheets 76,78 extends beyond the periphery of the panel's inner insulating core 72. Thus, as shown in FIGS. 3 and 4, opposed lateral edge portions 76a and 76b and upper and lower edge portions 76d and 76c of the first PIP sheet 76 extend beyond adjacent edges of the panel's insulating core 72. Similarly, opposed lateral edge portions 78a and 78b and upper and lower edge portions 78d and 78c of the second PIP sheet 78 extend beyond adjacent edge portions of the panel's insulating core 72. The edge portions of the first and second PIP sheets, 76,78 extending beyond the edges of the panel's insulating core 72 are adapted to receive connecting pins such as screws, nails or staples for securely attaching the structural wall panel 70 to support members such as of 2× dimensional lumber as described in detail below.

In accordance with another aspect of the present invention, there are disposed within the panel's insulating core 72 in a spaced manner plural compression struts for increasing the compressive strength of the structural wall panel 70. Thus, first and second compression struts 82 and 84 are disposed within the panel's insulating core 72 and in contact with the second PIP sheet 78. Similarly, third and fourth compression struts 80 and 86 are disposed within the panel's insulating core 72 in contact with the inner surface of the first PIP sheet 76. While the outer surface of each of the aforementioned compression struts is disposed in contact with and bonded to the inner surface of an adjacent PIP sheet, the inner surface of each of the compression struts is provided with a PIP backing layer. Thus, as shown in FIG. 5, which is an enlarged view of a portion of structural wall panel 70 shown in FIG. 4, for the case of the third compression strut 84. A PIP backing layer 88 is affixed to the inner surface of the compression strut 84 by means of an adhesive larger 96 and is disposed in contact with the inner panel's insulating core 72. An adhesive larger 94 bonds the PIP backing layer 88 to the panel's insulating core 72. The PIP backing layer 88 substantially increases the tensile strength of a compression strut comprised of a material such as wood composite. Conventional adhesive layers are used to bond the first and second PIP sheets 76,78 to opposed surfaces of the panel's insulating core 72, as shown for the case of adhesive layer 92 on the second PIP sheet. While the first and second PIP sheets 76,78 substantially increase the racking and tensile strength of the structural wall panel 70, the compression struts substantially increase the axial loading capacity of the panel. The compression struts are preferably comprised of wood, metal or a high strength plastic. The preferred thickness of the first and second PIP sheets 76,78 is in the range of 0.014" to 0.80" to provide the sheet with sufficient tensile strength to securely attach the panel to an adjacent structural support member using conventional connecting pins such as nails, screws or staples. Attaching a PIP backing layer to a compression strut permits the compression strut to also be comprised of materials of lesser strength such as oriented strand board. Oriented strand board struts provided with a PIP backing layer are capable of withstanding high compressive loads for supporting a roof or ceiling. Disposed on and attached to the panel's second PIP sheet 78 is an inner panel facing 74 preferably comprised of gypsum or cementous composite or other conventional building materials. An adhesive layer 90 bonds the inner panel facing 74 to the panel's second PIP sheet 78.

Figure 6:
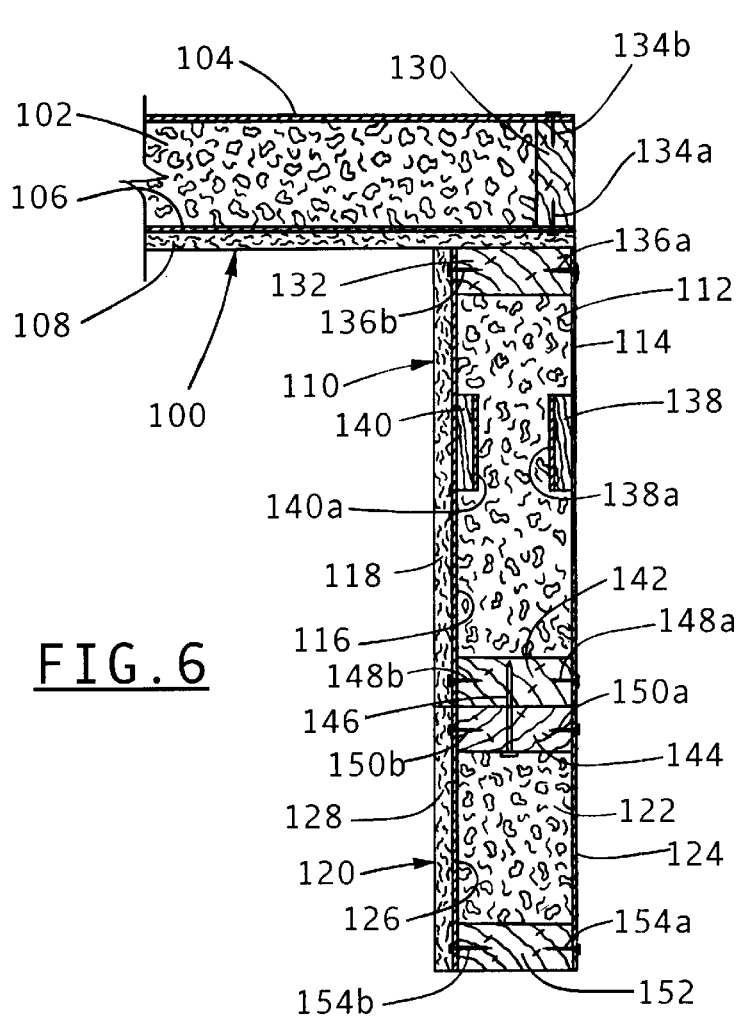
FIG. 6 is a sectional view of a pair of wall sections in accordance with the present invention connected together to form a 90° corner.

Referring to FIG. 6, there is shown a sectional view of a pair of wall sections in accordance with the present invention connected together to form a 90° corner. In FIG. 6, a first structural wall panel 100 is connected to a second structural wall panel 110 which, in turn, is connected to a third structural wall panel 120 by means of a pair of 2× dimensional lumber members. The first structural wall panel 100 includes an inner insulating core 102, and first and second PIP sheets 104 and 106 affixed to facing surfaces of the insulated core. A gypsum or cementous composite facing 108 is affixed to the second PIP sheet 106 forming the inner surface of the first structural wall panel 100. A conventional adhesive may be used to attach the gypsum composite facing 108 to the second PIP sheet 106 and to attach the two PIP sheets to opposed surfaces of the panel's insulating core 102. A lateral edge of the first structural Wall panel 100 is securely attached to a first stud 130 by means of connecting pins 134a and 134b. Connecting pins 134a and 134b are inserted through lateral edge portions of the second and first PIP sheets 106 and 104, respectively, which are attached to opposed surfaces of the panel's insulating core 102. A lateral edge of the panel's insulating core 102 is placed in abutting contact with the first stud 130 along the length thereof. The first and second PIP sheet 104, 106 are preferably 0.14" to 0.80" thick so as to be strong enough to securely attach the lateral edge of the first structural wall panel 100 to the first stud 130 by conventional connecting pins such as nails, screws or staples.

The second structural wall panel 110 similarly includes an inner insulating core 112 and first and second PIP sheets 114 and 116 attached to respective opposed surfaces of the insulating core. An inner facing 118 such as of gypsum or cementous composite is attached to the panel's second PIP sheet 116. Respective lateral edges of the panel's first and second PIP sheets 114,116 are securely attached to a second stud 132 by means of respective connecting pins 136a and 136b. Connecting pins 136a and 136b are respectively inserted through overhanging lateral edge portions of the first and second PIP sheets 114,116 and into opposed surfaces of the second stud 132. Opposed lateral edge portions of the first and second PIP sheets 114, 116 are attached to a third stud 142 by means of connecting pins 148a and 148b, respectively. Thus, opposed lateral edges of the second structural wall panel 110 are securely attached to the second and third studs 132 and 142.

Also in accordance with the present invention, disposed within the insulating core 112 of the second structural wall panel 110 are first and second compression struts 138 and 140. The first and second compression struts 138, 140 are in the form of elongated, linear structural members which preferably extend the full length, or height, of the second structural wall panel 110. The first and second compression struts 138, 140 are preferably comprised of wood, but may also be formed of a high strength, lightweight metal, plastic or wood composite. The first and second compression struts 138, 140 provide the second structural wall panel 110 with high compressive strength for supporting overhead structures such as roofs and ceilings. Disposed on respective inner surfaces on each of the first and second compression struts 138, 140 are PIP backing sheets 138a and 140b, respectively. A conventional adhesive is used to attached each of the first and second compressions struts 138, 140 respectively to the first and second PIP sheets 114 and 116 as well as to affix the first and second PIP backing sheets 138a and 140b to an associated compression strut as well as to panel's insulating core 112. This bonding arrangement provides the second structural wall panel 110 with high tensile strength.

The third stud 142 is attached to a fourth stud 144 by means of a connecting pin 146, such as a nail or screw. The combination of the third and fourth studs 142, 144 provide the wall section comprised of the second structural wall panel 110 and the third structural wall panel 120 with high compressive strength for supporting large loads. The third structural wall panel 120 is comprised of an inner insulating core 122 and first and second PIP sheets 124 and 126 attached to opposed surfaces of the insulating core. Attached to the panel's second PIP sheet 126 is an inner facing 128 such as of gypsum or cementous composite. Adjacent lateral edges of the panel's first and second PIP sheets are attached to the fourth stud 144 by means of connecting pin 150a and 150b, respectively. Similarly, opposed lateral edges of the panels first and second PIP sheets 124, 126 are attached to a fifth stud 152 by means of connecting pins 154a and 154b, respectively.

Figure 7:
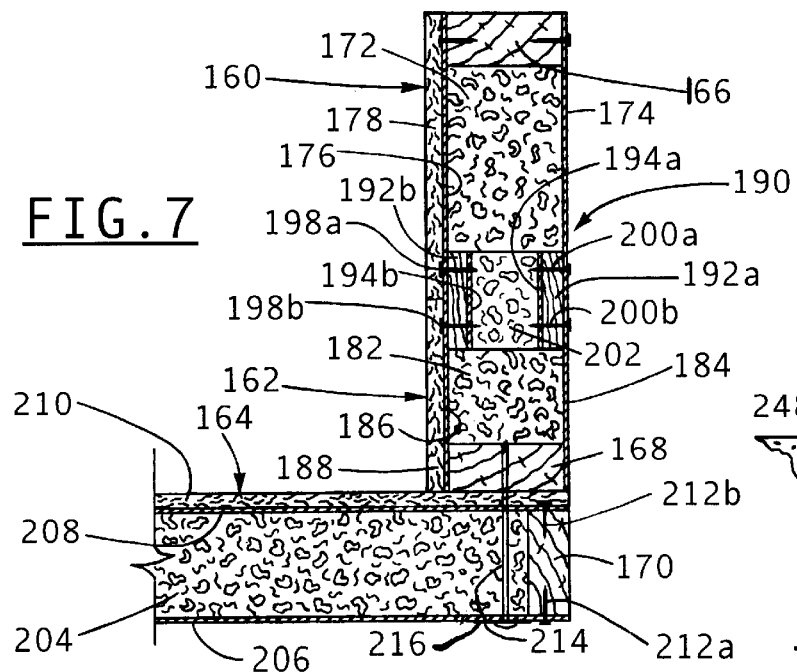
FIG. 7 is a sectional view showing the connection between plural structural wall panels in accordance with the present invention, wherein two of the structural wall panels are connected by means of an insulated spline in accordance with another aspect of the present invention.

Referring to FIG. 7, there is shown a sectional view illustrating the connection between plural structural wall panels in accordance with the present invention, where two of the structural wall panels are connected by means of an insulating spline 190 in accordance with another aspect of the present invention. FIG. 7 shows first, second and third structural wall panels 160, 162 and 164 connected together to form a 90° corner. The first structural wall panel 150 includes an insulating core 172 and first and second PIP sheets 174 and 176 attached to opposed surfaces of the insulating core. First structural wall panel 160 further includes a gypsum composite facing 178 attached to the panel's second PIP sheet 176. Similarly, the second structural wall panel 162 includes an insulating core 182 and first and second PIP sheets 184 and 186 attached to opposed surfaces of the insulating core. A gypsum composite facing 188 is affixed to the second PIP sheet 186 of the second structural wall panel 162. Finally, the third structural wall panel 164 includes an insulating core 204 and first and second PIP sheets 206 and 208 attached to opposed surfaces of the panel's insulating core. A gypsum composite facing 110 is affixed to the second PIP sheet 208 of the third structural wall panel 164.

A first lateral edge of the first structural wall panel 160 is connected to a first stud 166 by means of the panel's first and second PIP sheets 174, 176 using connecting pins as shown in the figure and as previously described. A second, opposed lateral edge of the first structural panel 160 is attached to the insulating connecting spine 190 by means of connecting pins 200a and 198a respectively inserted through overhanging lateral edge portions of the panel's first and second PIP sheets 174, 176. Connecting pins 200a and 198a are also inserted into first and second studs 192a and 192b, respectively, of the insulating connecting spline 190. Respectively attached to inner surfaces of the spline's first and second studs 192a, 192b are first and second PIP sheets 194a and 194b. Disposed between the spline's first and second studs 192a and 192b and attached to the spline's first and second PIP sheets 194a, 194b is an insulating core 202 comprised of an insulating material such as plastic foam. The spline's insulating core 202 is optional.

The second structural insulated panel 162 also includes in insulating core 182 and first and second PIP sheets 184 and 186 attached to opposed surfaces of the insulating core. A gypsum or cementous composite facing 188 is affixed to the panel's second PIP sheet 186. Adjacent lateral edges of the first and second PIP sheets 184, 186 are respectively attached to the insulating connecting spline's first and second studs 192a and 192b by means of connecting pins 200b and 198b. Adjacent edges of the panel's first and second PIP sheets 184, 186 are attached to the second stud 168 by means of respective connecting pins as shown in the figure.

The third structural wall panel 164 also includes an inner insulating core 204 and first and second PIP sheets 206 and 208 respectively attached to opposed surfaces of the insulating core. Attached to the second PIP sheet 208 is a gypsum or cementous composite facing 210. Adjacent lateral edges of the first and second PIP sheets, 206, 208 are attached to a third stud 170 by means of a respective connecting pins 212a and 212b. A lateral edge of the panel's insulating core 204 is placed in abutting contact with the third stud 170 along the length thereof. A to connecting pin 214 such as a nail or screw is used to attach the third structural wall panel 164 to the second stud 168. Finally, connecting pin 214 is inserted through a washer or thin plate 216 disposed on the panel's first PIP sheet 206 for securely attaching the third structural wall panel 164 to the third stud 170.

Figure 8:
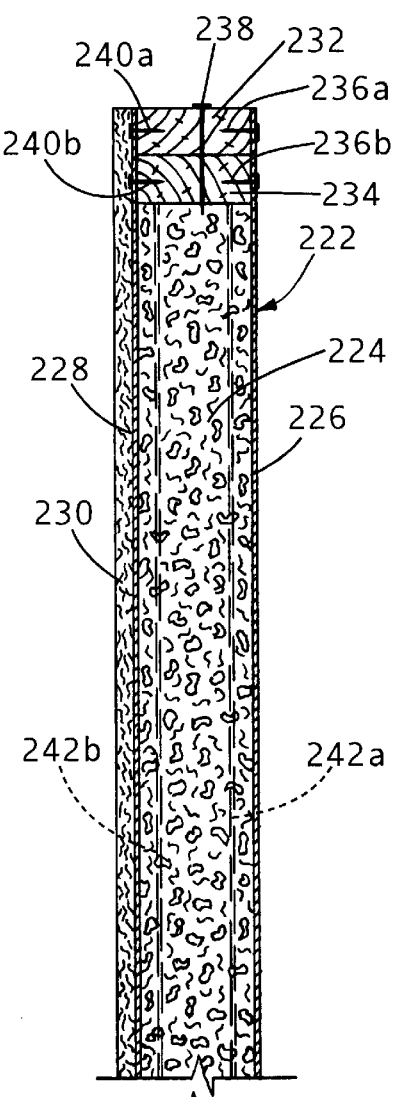
FIG. 8 is a partial sectional view of another embodiment of a structural wall panel in accordance with the present invention incorporating plural internal compression members.

Referring to FIG. 8, there is shown a partial sectional view of another embodiment of a structural wall panel 222 in accordance with the present invention. Structural wall panel 222 includes an insulating core 224 and first and second PIP sheets 226 and 228 attached to opposed surfaces of the insulating core. An inner facing 230 such as a gypsum or cementous composite is affixed to the panel's second PIP sheet 228. Upper and lower edges of the first and second PIP sheets 226, 228 extend above and below the upper and lower edges of the panel's insulating core 224. Disposed in contact with the upper edge of the panel's insulating core 224 is a double header top plate comprised of first and second 2× structural members 232 and 234. The first and second structural members 232, 234 are connected by means of a connecting pin 238. Respective upper edges of the first and second PIP sheets 226, 228 are securely attached to the first and second structural member 232, 234 by means of first and second coupling pins 236a and 236b and third and fourth coupling pins 240a and 240b, respectively. Similarly, respective lower edges of the first and second PIP sheets 226 and 228 are securely attached to a base plate 244 by means of first and second coupling pins 248a and 248b. Base plate 240 is positioned on and connected to a concrete base, or foundation, 246. Disposed within structural wall panel 222 and affixed to its first and second PIP sheets 226, 228 as well as to the panel's insulating core 224 are first and second compression members 242a and 242b (shown in dotted line form). The first and second compression members 242a, 242b may be in the form of 2× dimensional lumber or may form an insulated spline for connecting structural wall panel 222 to another similarly configured structural wall panel, which is not shown in the figure for simplicity.

Figure 9A:
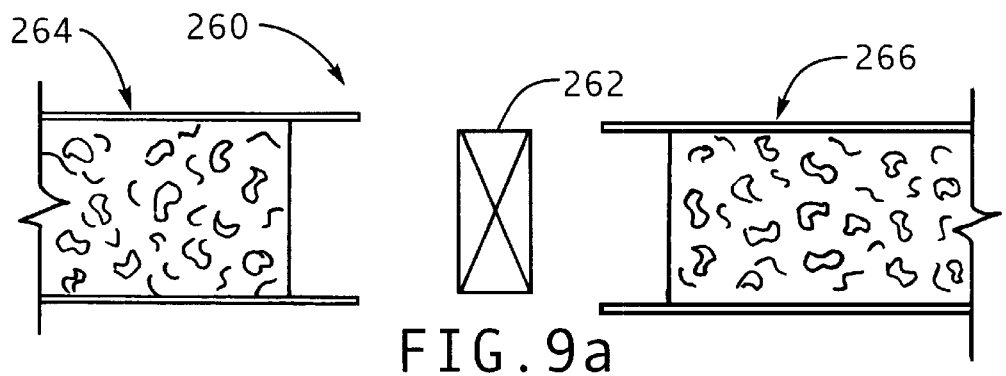
FIGS. 9a and 9b are respectively exploded and assembled sectional views of another arrangement for attaching a pair of structural panels to a stud or spline in accordance with the present invention where the panels' outer facings are arranged in an overlapping manner.
Figure 9B:
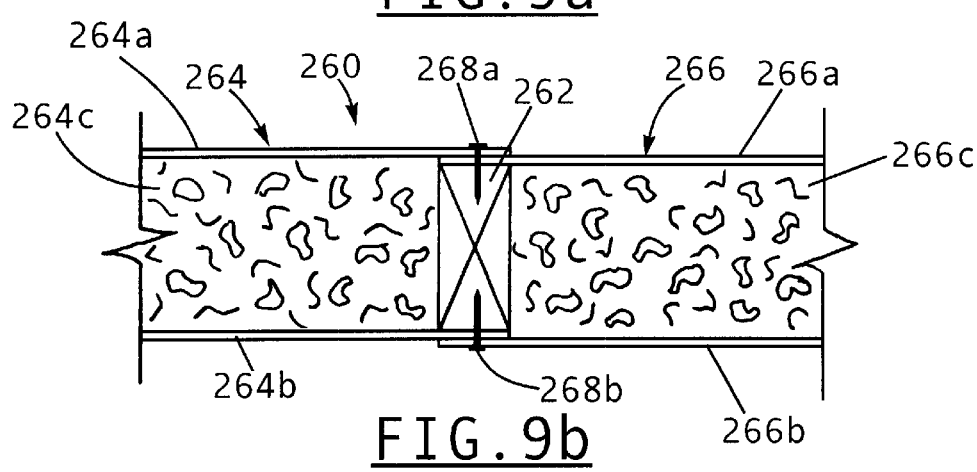

Referring to FIGS. 9a and 9b there are respectively show exploded and assembled sectional views of another panel coupling arrangement in accordance to the present invention. In these figures, first and second structural panels 264 and 266 are connected together by means of a spline or stud 262. For simplicity, element 262 is hereinafter referred to as a spline, it being understood that this coupling member could be virtually any other type of structural member used the building construction for connecting panels. The first structural panel 264 includes first and second plastic impregnated paper facings 264a and 264b, as well as an inner insulating core 264c. Similarly, the second structural panel 266 includes first and second plastic impregnated paper facings 266a and 266b, as well as an inner insulating core 266c. As shown in FIG. 9b, the first plastic impregnated paper facings 264a and 266a are arranged in an overlapping manner as are the second plastic impregnated paper facings 264b and 266b. With the adjacent outer facings of each panel arranged in an overlapping manner on spline 262, first and second connecting pins 268a and 268b are respectively inserted through the first and second overlapping faces of the two panels and into spline 262. By arranging the adjacent facings of the connected structural panels in an overlapping manner, an improved seal for the moisture barrier provided by the plastic impregnated paper facings of the two panels is provided and the high tensile strength of these facings allows smaller splines and studs to be used for joining adjacent panels. The panel connecting approach shown in FIG. 9b also takes greater advantage of the high strength of the plastic impregnated paper sheets which may have greater tensile strength than the connecting spline or stud so as to provide a more secure connection between adjacent structural panels.

Figure 10A:
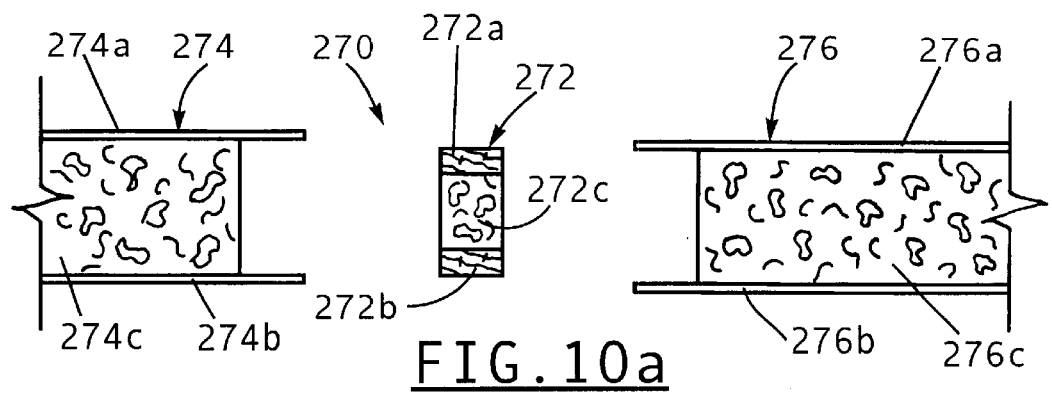
FIGS. 10a and 10b are respectively exploded and assembled sectional views of another structural panel coupling arrangement employing a stud or spline in accordance with the present invention, where the outer facings of the panels are arranged in an overlapping manner.
Figure 10B:
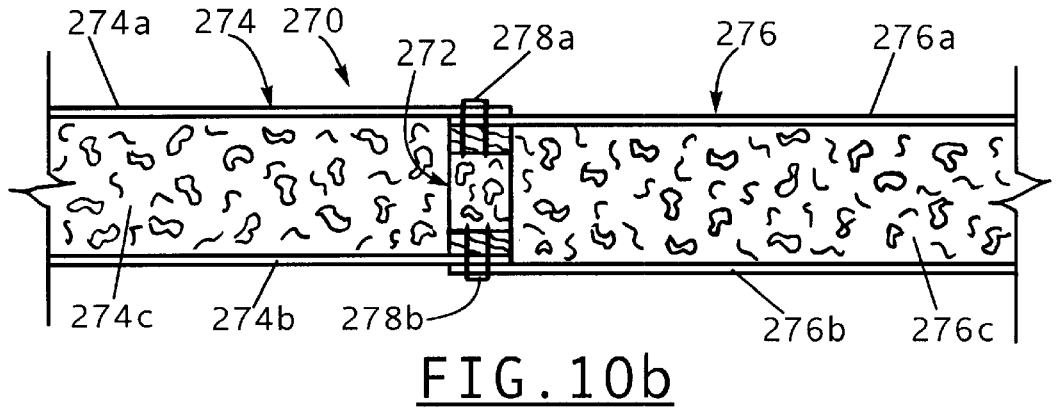

Referring to FIGS. 10a and 10b, there are respectively shown exploded and assembled sectional views of first and second structural panels 274 and 276 connected together in accordance with another aspect of the present invention. The first structural panel 274 includes first and second plastic impregnated paper facings 274a and 274b, as well as an inner insulating core 274c. Similarly, the second structural 276 includes first and second plastic impregnated paper facings 276a and 276b, as well as an inner insulating core 276c. In the arrangement shown in FIGS. 10a and 10b, the first and second structural panels 274 and 276 are connected together by means of an insulated spline or stud 270. Insulated spline 270 includes an inner insulating core 272c and first and second outer studs 272a and 272b. As shown in FIG. 10b, the first plastic impregnated paper facings 274a and 276a and the second plastic impregnated paper facings 274b and 276b of the first and second structural panels 274, 276 are arranged in an overlapping manner on the insulated spline 272. First and second staples 278a and 278b are inserted through adjacent overlapping portions of the plastic impregnated paper facings of the two panels and into outer studs 272a and 272b, respectively, of the insulated spline 272. This adjacent structural panel connecting arrangement using insulated spline 272 provides a high strength, moisture sealed connection between the two panels using their high strength plastic impregnated paper outer facing.

There has thus been shown a generally planar structural wall panel for use in a building structure. The panel includes an inner core of insulating material such as plastic foam and first and second plastic impregnated paper sheets attached to opposed surfaces of the panel's insulating core. The PIP sheets are 0.014" to 0.080" thick and are comprised of paper impregnated with plastic such as urethane, polystyrene or polyisocyanurate. The edges of the PIP sheets extend beyond adjacent edges of the panel's inner insulating core and are adapted to receive coupling pins such as nails, screws or staples for securely mounting the panel to 2× dimensional lumber members in the building structure. Outer edge portions of the panel's insulating core are positioned in abutting contact with the structural support members, with the extended edges of the pair of PIP sheets straddling a 2× structural member which may be in the form of a wall stud or a top or base plate. Compression struts may be provided in a spaced manner within the panel's insulating core and inside the panel's outer facings to accommodate large axial loading on the panel. The inner PIP sheet may have attached thereto a gypsum or cementous composite sheet to provide a finished panel for easy and quick insulation in the building structure. An insulating spline may be attached to adjacent edge portions of the PIP sheets of a pair of adjacent structural wall panels for providing an insulated connection between the panels.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A structural panel for use with 2× stick structural members in a building structure, said structural panel comprising:
   a generally planar insulating core having plural peripheral edges and first and second opposed sides;
   first and second high tensile strength plastic impregnated paper sheets respectively attached to the first and second sides of said insulating core, each of the plastic impregnated paper sheets having plural edge portions each extending outwardly beyond an adjacent edge of and in spaced relation from said insulating core; and
   connecting pins inserted through adjacent edge portions of the first and second impregnated paper sheets and into an adjacent 2× stick structural member for mounting the structural panel in the building structure.

2. The structural panel of claim 1 wherein said paper sheets are impregnated with urethane, polystyrene or polyisocyanurate.

3. The structural panel of claim 2 wherein said paper sheets are 0.14" to 0.80" thick.

4. The structural panel of claim 3 further comprising first and second layers of an adhesive respectively disposed between and bonding said first and second plastic impregnated paper sheets to said insulating core.

5. The structural panel of claim 4 wherein said layers of adhesive are comprised of urethane or epoxy cement, glue or mastic.

6. The structural panel of claim 5 wherein said insulating core is comprised of expanded polystyrene or urethane.

7. The structural panel of claim 6 wherein said connecting pins are nails, screws or staples.

8. The structural panel of claim 1 further comprising a compression strut attached to one of said plastic impregnated paper sheets and extending the length of the structural panel for increasing the compressive strength of the panel.

9. The structural panel of claim 8 wherein said compression strut is disposed within and attached to the insulating core of the structural panel.

10. The structural panel of claim 9 further comprising first and second adhesive layers for respectively bonding said compression strut to one of said plastic impregnated paper sheets and to said insulting core.

11. The structural panel of claim 10 further comprising a third high tensile strength plastic impregnated paper sheet disposed between and bonded to said compression strut and said insulating core.

12. The structural panel of claim 11 further comprising adhesive layers disposed between and bonding said compression strut to said one of said plastic impregnated paper sheets and to said insulating core.

13. The structural panel of claim 12 wherein said compression strut is comprised of wood, a wood composite, plastic or metal.

14. The structural panel of claim 1 further comprising plural compression struts attached in a spaced manner to one of said plastic impregnated paper sheets and extending the length of the structural panel for increasing the compressive strength of the panel.

15. The structural panel of claim 1 further comprising plural compression struts attached in a spaced manner to said first and second high tensile strength plastic impregnated paper sheets and extending the length of the structural panel for increasing the compressive strength of the panel.

16. The structural panel of claim 15 wherein said compression struts are disposed within and attached to said insulating core of the structural panel.

17. The structural panel of claim 1 wherein a first lateral edge of the structural panel is connected to an adjacent 2× stick structural member and a second opposed lateral edge of the structural panel is connected to an insulating spline by connecting pins inserted through adjacent edge portions of the first and second impregnated paper sheets and into said insulating spline.

18. The structural panel of claim 17 wherein said insulating spline includes an inner insulating core and first and second outer facings attached to respective opposed surfaces of said insulating core, and wherein connecting pins are inserted through adjacent edge portions of the first and second impregnated sheets and into the outer facings of said insulating spline.

19. The structural panel of claim 18 wherein said outer facings of said insulating spline are comprised of wood, wood composite, plastic or metal.

20. The structural panel of claim 19 wherein the insulating core of said insulating spline is comprised of expanded polystyrene or urethane.

21. A structural panel connecting arrangement comprising:

first and second generally planar structural panels each having a respective insulating core and first and second plastic impregnated paper facings attached to opposed surfaces of an insulating core, wherein an edge portion of each of said first and second plastic impregnated paper facings extends beyond an adjacent edge of the insulating core to which said plastic impregnated facings are attached;

a structural member disposed between and in abutting contact with adjacent edges of the insulating cores of said first and second structural panels, wherein adjacent edge portions of the first and second plastic impregnated paper facings of said first and second structural panels are arranged in an overlapping manner on said structural member; and coupling pins inserted through adjacent overlapping edges of the first and second plastic impregnated paper facings of said first and second structural panels and into said structural member for forming a high strength, sealed connection between the structural panels.

22. The structural panel connecting arrangement of claim 21 wherein said plastic impregnated paper facings are 0.014" to 0.080" thick.

23. The structural panel connecting arrangement of claim 21 wherein said plastic impregnated paper facings are comprised of 15–50% impregnated plastic.

24. The structural panel connecting arrangement of claim 21 wherein said structural member is a stud or spline.

25. The structural panel connecting arrangement of claim 24 wherein said stud is comprised of 2× dimensional lumber.

26. The structural panel connecting arrangement of claim 24 wherein said spline is insulated.

27. The panel connecting arrangement of claim 26 wherein said insulated spline includes an insulating core with first and second opposed surfaces, and wherein that insulated spline further includes first and second studs respectively attached to said first and second opposed surfaces and wherein said coupling pins are inserted into said first and second studs.

28. The panel connecting arrangement of claim 21 wherein said coupling pins are nails, screws or staples.

29. The panel connecting arrangement in claim 21 wherein said insulating core is comprised of plastic foam.

* * * * *

UNITED STATES PATENT AND TRADEMARK OFFICE
CERTIFICATE OF CORRECTION

PATENT NO.    : 6,481,172 B1
DATED         : November 19, 2002
INVENTOR(S)   : William H. Porter It is certified that error appears in the above-identified patent and that said Letters Patent is hereby corrected as shown below:

Column 1,
Line 26, after the word "inserted", please insert the words -- in a slot --

Column 6,
Line 8, delete the word "Wall" and insert -- wall -- in its place.

Column 8,
Line 5, delete the phrase "A to connecting pin" and insert -- A connecting pin -- in its place.

Signed and Sealed this

Fourth Day of March, 2003

Attest:

JAMES E. ROGAN
Attesting Officer        Director of the United States Patent and Trademark Office